(12) United States Patent  
Lim et al.

(10) Patent No.: US 7,340,110 B2
(45) Date of Patent: Mar. 4, 2008

(54) DEVICE AND METHOD FOR CORRECTING SKEW OF AN OBJECT IN AN IMAGE

(75) Inventors: Chae-Whan Lim, Taegukwangyok-shi (KR); Nam-Chul Kim, Taegukwangyok-shi (KR); Ick-Hoon Jang, Kumi-shi (KR); Jun-Hyo Park, Kyongsan-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 10/765,085

(22) Filed: Jan. 28, 2004

(65) Prior Publication Data

US 2004/0184674 A1    Sep. 23, 2004

(30) Foreign Application Priority Data

Jan. 30, 2003    (KR) .................... 10-2003-0006417

(51) Int. Cl.
*G06K 9/36* (2006.01)
(52) U.S. Cl. ...................... 382/289; 382/290
(58) Field of Classification Search ............... 382/289, 382/290
See application file for complete search history.

(56) References Cited

U.S. PATENT DOCUMENTS

| | | | | |
|---|---|---|---|---|
| 4,876,732 A | 10/1989 | Miyagawa et al. | ......... | 382/288 |
| 5,101,438 A | 3/1992 | Kanda et al. | ............... | 382/176 |
| 5,214,718 A * | 5/1993 | Khosla | ...................... | 382/166 |
| 5,995,657 A | 11/1999 | Sunakawa et al. | .......... | 382/170 |
| 6,040,818 A * | 3/2000 | Minami et al. | ............. | 345/589 |

FOREIGN PATENT DOCUMENTS

EP    0 431 960 A2    6/1991

OTHER PUBLICATIONS

J.H. Park et al.: "Skew correction of business card images in PDA"; IEEE Conf. On☐☐Communications, Computers And Signal Processing (PACRIM 2003); Aug. 28, 2003.*
G. Kapogiannopoulos et al.: "A fast high precision algorithm for the estimation of skew angle using moments"; Proc. International Conference Signal Processing, Pattern Recognition, And Applications (SPPRA 2002), IASTED; Jun. 25, 2002; pp. 275-279.

(Continued)

*Primary Examiner*—Matthew C. Bella
*Assistant Examiner*—G. F. Cunningham
(74) *Attorney, Agent, or Firm*—Roylance, Abrams, Berdo & Goodman, L.L.P.

(57) ABSTRACT

A device and method for correcting a skew of an object in an image. The device and method comprises an input part for receiving an image; a binarization part for binarizing pixels of the image into pixels having brightness values for character pixels and background pixels; a candidate stripe generation part for generating candidate stripes by performing dilation on character regions of the binarized image. The device and method further comprises a stripe classification part for classifying candidate stripes having a predetermined eccentricity and blob size among the candidate stripes, as valid stripes; a skew angle decision part for calculating direction angles of the classified stripes, and determining a direction angle having the largest count value as a skew angle; and a skew correction part for correcting a skew of an image by rotating the mage by the skew angle.

18 Claims, 17 Drawing Sheets

OTHER PUBLICATIONS

Su Chen et al.: "Automatic text skew estimation in document images"; Document Analysis And Recognition, 1995.; Proceedings Of The Third International Conference On Montreal, Que., Canada; Aug. 14-16, 1995; Los Alamitos, CA, USA, IEEE Comput. Soc, US; vol. 2; Aug. 14, 1995; pp. 1153-1156.

Osamu Nakamura et al.: "Extraction Of Photographic Area From Document Images" Electronics & Communications In Japan, Part I—Communications, Wiley, Hoboken, NJ, US; vol. 71, No. 6; Jun. 1, 1988; pp. 76-85.

J.H. Park et al.: "Skew correction of business care images in PDA"; IEEE Conf. On Communications, Computers And Signal Processing (PACRIM 2003); Aug. 28, 2003.

* cited by examiner

DEVICE AND METHOD FOR CORRECTING SKEW OF AN OBJECT IN AN IMAGE

PRIORITY

This application claims priority under 35 U.S.C. § 119 to an application entitled "Device and Method for Correcting Skew of Object in Image" filed in the Korean Intellectual Property Office on Jan. 30, 2003 and assigned Ser. No. 2003-6417, the contents of which are incorporated herein by reference.

BACKGROUND OF THE INVENTION

1. Field of the Invention

The present invention relates generally to a preprocessing device and method for recognizing image characters, and in particular, to a device and method for correcting a skew of an object in an input image before recognizing image characters.

2. Description of the Related Art

Generally, a preprocessing operation is performed to recognize image characters. The "preprocessing operation" refers to an operation of processing an image before recognition of the characters in the image. The image preprocessing operation can include an operation of determining whether or not an input image is appropriate for character recognition, an operation of correcting the skew of an object in an input image, an operation of properly correcting the size of an input image, and an operation of binarizing an image signal (i.e. transforming an image function into a binary image) so that characters of the image signal can be recognized.

A device for recognizing image characters generally recognizes characters from an image. Since the image is photographed by a camera, an object in the image may be skewed. Therefore, in order to increase a recognition rate, it is preferable to correct a skewed object in the mage before performing a recognition operation.

SUMMARY OF THE INVENTION

It is, therefore, an object of the present invention to provide a device and method for correcting a skew of an object in an image during binarization of an image signal.

It is another object of the present invention to provide a device and method for correcting a skew of an object in an input image by classifying the image into character blocks and background blocks and calculating a skew of the classified character blocks during binarization of an image signal.

It is further another object of the present invention to provide a device and method for correcting a skew of an object in an input image by classifying the image into character blocks and background blocks, converting the character blocks into character strings and then calculating a skew angle of the object in the image according to a skew of the character strings during binarization of an image signal.

It is yet another object of the present invention to provide a device and method for correcting a skew of an object in an input image by classifying character blocks during binarization of an image signal, creating candidate stripes by extending the binarized character region, selecting the longest and largest stripe among the generated candidate stripes, and then calculating a skew angle according to a skew of the selected stripe.

It is still another object of the present invention to provide a device and method for correcting a skew of an object of an input image by classifying character blocks during binarization of an image signal, subsampling the binarized character blocks in a horizontal direction, creating candidate stripes by extending the binarized character region, selecting the long and largest stripe among the created candidate stripes, and then calculating a skew angle according to a skew of the selected stripe.

In accordance with one aspect of the present invention, a device corrects a skew of an object in an image. The device comprises an input part for receiving an image; a binarization part for binarizing pixels of the image into pixels having brightness values for character pixels and background pixels; a candidate stripe generation part for generating candidate stripes by performing dilation on character regions of the binarized image; a stripe classification part for classifying candidate stripes having a predetermined eccentricity and blob size among the candidate stripes, as valid stripes; a skew angle decision part for calculating direction angles of the classified stripes, and determining a direction angle having the largest count value as a skew angle; and a skew correction part for correcting a skew of an image by rotating the image by the skew angle.

In accordance with another aspect of the present invention, a device corrects a skew of an object in an image. The device comprises an input part for receiving an image; a binarization part for binarizing pixels of the image into pixels having brightness values for character pixels and background pixels; a horizontal pixel subsampling part for performing horizontal subsampling on the binarized image at a predetermined ratio; a candidate stripe generation part for dilating character blocks in the binarized image and generating candidate stripes; a vertical pixel subsampling part for performing vertical subsampling on the image having the candidate stripes at a predetermined ratio; a stripe classification part for classifying candidate stripes having a predetermined or larger eccentricity and blob size among the vertical-subsampled candidate stripes, as valid stripes; a skew angle decision part for calculating direction angles of the classified stripes, and determining a direction angle having the largest count value as a skew angle; and a skew correction part for correcting a skew of an object in an image by rotating the mage by the skew angle.

In accordance with further another aspect of the present invention, a method corrects a skew of an object in an image. The method comprises the steps of receiving an image; binarizing pixels of the image into pixels having brightness values for character pixels and background pixels; dilating character regions of the binarized image and generating candidate stripes; classifying candidate stripes having a predetermined or larger eccentricity and blob size among the candidate stripes, as valid stripes; calculating direction angles of the classified stripes; determining a direction angle having the largest count value among direction angles as a skew angle; and correcting a skew of an image by rotating the mage by the skew angle.

In accordance with further another aspect of the present invention, a method corrects a skew of an object in an image. The method comprises the steps of receiving an image; binarizing pixels of the image into pixels having brightness values for character pixels and background pixels; performing horizontal subsampling on the binarized image at a predetermined ratio to reduce horizontal pixels; dilating character blocks in the vertical-subsampled binarized image and generating candidate stripes; performing vertical subsampling on the binarized image having the candidate stripes at a predetermined ratio to reduce vertical pixels; classifying candidate stripes having a predetermined or above eccentricity and blob size among the vertical-sub-sampled candidate stripes, as valid stripes; calculating direction angles of the classified stripes; accumulating the direction angles and determining a direction angle having the largest count value as a skew angle; and correcting a skew of an object in an image by rotating the mage by the skew angle.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

In the following description, specific details such as a size of an image and sizes of character and background blocks are provided as examples. It should be obvious to those skilled in the art that the invention can be implemented without the examples or by modifying the examples.

In embodiments of the present invention, an input image is assumed to have a size of 640×480 pixels. The term "block" refers to character and background blocks, and it is assumed herein that each of the blocks has a size of 8×8 pixels. In addition, the term "grouped block" refers to surrounding blocks of a center block to be binarized, and it is assumed herein that each of the surrounding blocks has a size of 24×24 pixels.

In addition, the term "character string" as used herein refers to a string including separated characters, and the term "stripe" refers to a plurality of characters arranged densely at regular intervals, forming a stripe. In the embodiments of the present invention, a skew of an object in an image is corrected by calculating a direction angle formed by the stripes. A second embodiment of the present invention described below provides a device and method for correcting a skew of an object in an image using the stripes.

Embodiments of the present invention will now be described in detail with reference to the accompanying drawings.

Figure 1:
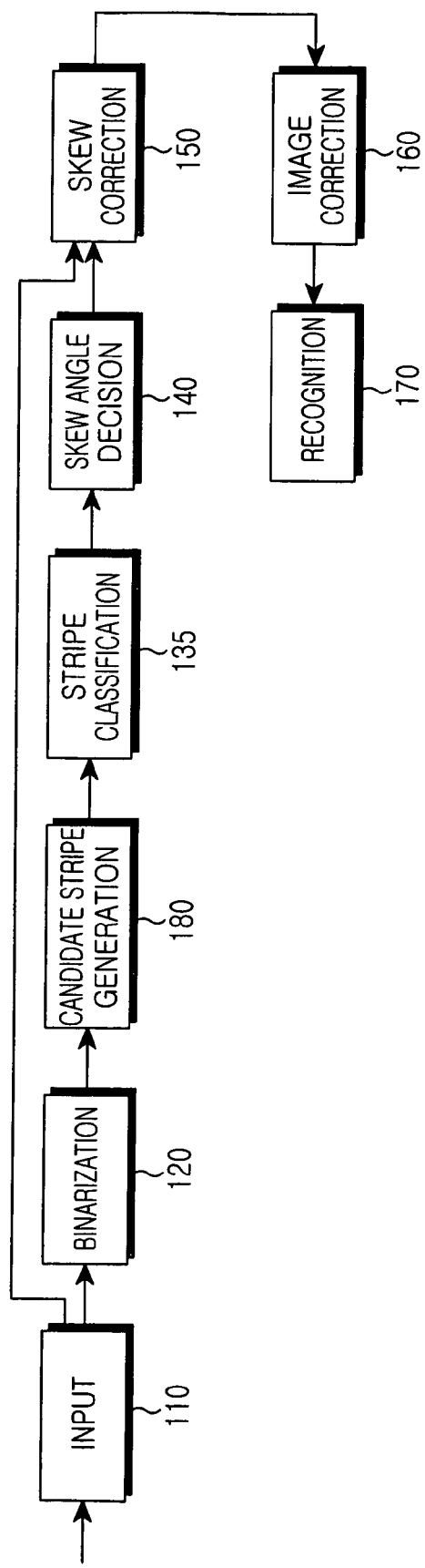
FIG. 1 is a block diagram illustrating a structure of a device for correcting a skew of an object in an image according to a first embodiment of the present invention.

FIG. 1 is a block diagram illustrating a structure of a device for correcting a skew of an object in an image according to a first embodiment of the present invention. Referring to FIG. 1, an input part 110 has a function of receiving an input image. Here, a camera, a scanner, a communication interface including a modem and a network, and a computer can serve as the input part 110. It is assumed herein the input image is comprised of 640 (column)×640 (row) pixels.

A binarization part 120 divides the image received from the input part 110 into blocks, classifies the divided blocks into character blocks and background blocks by analyzing pixels included in the divided blocks, and then binarizes the pixels in each of the blocks. The binarization part 120 classifies the blocks into character blocks and background blocks in order to binarize a region where characters are included and then classify character strings using the binarization results. As mentioned above, it is assumed herein that each of the blocks has a size of 8×8 pixels.

A candidate stripe generation part 180 performs dilation on a region of the character blocks and then generates candidate stripes in which neighboring characters are connected. The candidate stripe generation part 180 performs dilation on the region of the binarized character blocks and then generates candidate stripes in which neighboring characters are connected. Further, the candidate stripe generation part 180 performs erosion on the character blocks in order to prevent the candidate stripes neighboring up and down in the dilation process from being connected with each other.

A stripe classification part 135 classifies stripes having a predetermined size or above among the candidate stripes. The stripe classification part 135 calculates a blob size and/or eccentricity using the binarized candidate stripes and then classifies the stripes having the predetermined size or larger. The stripes are used for calculating a direction angle of an object, within the image, skewed with respect to a horizontal axis of the image.

A skew angle decision part 140 calculates direction angles of the classified stripes, accumulates count values of the direction angles angle by angle, selects a direction angle having the largest count value, and determines the selected direction angle as a skew angle of an object within the image. The skew angle decision part 140 calculates the direction angles of the character strings, accumulates the count values of direction angles angle by angle, and determines a direction angle having the largest count value as a skew angle.

A skew correction part 150 receives an input image signal output from the input part 110, rotates the image signal based on the skew angle determined by the skew angle decision part 140, and corrects a skew of an object in the received image.

An image correction part 160 inserts an image signal into a corner of the image in which the skew of the object is corrected. That is, if the skew correction part 150 corrects the skew of the object within the image, a region in which no pixel exists occurs due to the rotation of the image. The image correction part 160 fills specified pixels in an empty region of the image, caused by the skew correction. Because the pixels are filled irrespective of character data, an output of the skew correction part 150, even though it is directly output to a recognition part 170, does not affect the process of recognizing characters from the detected image.

The recognition part 170 recognizes an image signal output from the image correction part 160.

Figure 2:
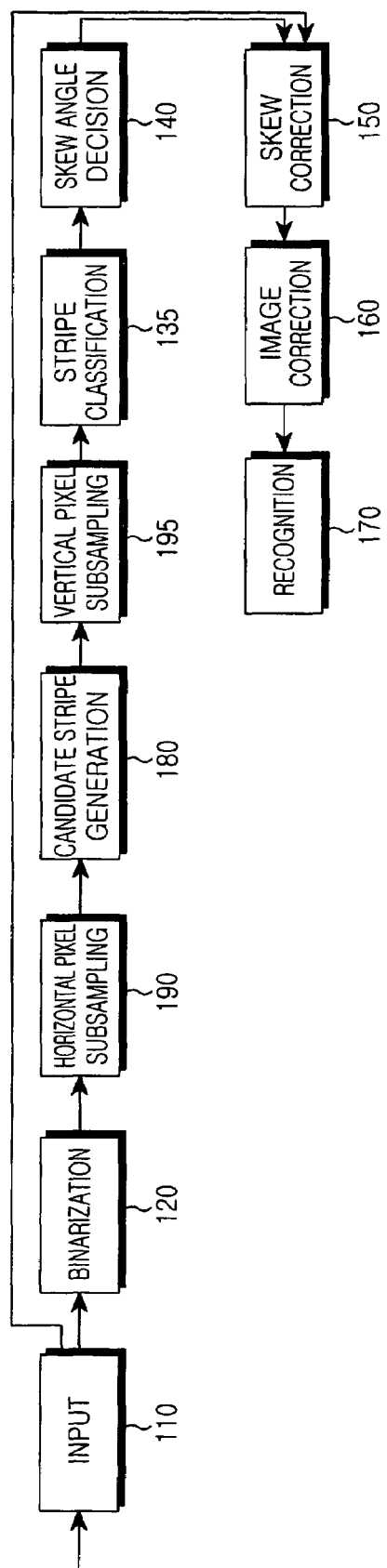
FIG. 2 is a block diagram illustrating a structure of a device for correcting a skew of an object in an image according to a second embodiment of the present invention.

FIG. 2 is a block diagram illustrating a structure of a device for correcting a skew of an object in an image according to a second embodiment of the present invention. Referring to FIG. 2, an input part 110 has a function of receiving an input image. Here, a camera, a scanner, a communication interface including a modem and a network, and a computer can serve as the input part 110. It is assumed herein the input image is comprised of 640 (column)×640 (row) pixels.

A binarization part 120 divides the image received from the input part 110 into blocks, classifies the divided blocks into character blocks and background blocks by analyzing pixels included in the divided blocks, and then binarizes the pixels in each of the blocks. The binarization part 120 classifies the blocks into character blocks and background blocks in order to binarize a region where characters are included and then classify character strings using the binarization results. As mentioned above, it is assumed herein that each of the blocks has a size of 8×8 pixels.

A horizontal pixel subsampling part 190 performs horizontal subsampling on the binarized image and then reduces horizontal pixels of the image. The horizontal pixel subsampling part 190 reduces the horizontal pixels in order to allow character strings to be appropriately horizontally arranged in the horizontal direction when candidate stripes are generated.

A candidate stripe generation part 180 performs dilation on a region of the character blocks and then generates candidate stripes in which neighboring characters are connected. The candidate stripe generation part 180 performs dilation on the region of the binarized character blocks and then generates candidate stripes in which neighboring characters are connected. Further, the candidate stripe generation part 180 performs erosion on the character blocks in order to prevent the neighboring (e.g., adjacent) candidate stripes in the dilation process from being connected with each other.

A vertical pixel subsampling part 195 performs vertical subsampling on the image converted into the candidate stripes at a reduction ratio of the horizontal pixels, and reduces vertical pixels. The vertical pixel subsampling part 195 recovers an original aspect ratio from an aspect ratio changed due to the horizontal pixel reduction by the horizontal pixel subsampling part 190. Even though the horizontal pixels are increased in number, the vertical pixel subsampling part 195 can recover the original aspect ratio.

A stripe classification part 135 classifies stripes having a predetermined size or larger among the candidate stripes in which the vertical pixels are reduced in number. The stripe classification part 135 calculates a blob size and/or eccentricity using the binarized candidate stripes and then classifies the stripes having the predetermined size or larger. The stripes are used for calculating a direction angle of an object, within the image, skewed with respect to a horizontal axis of the image.

A skew angle decision part 140 calculates direction angles of the classified stripes, accumulates count values of the direction angles angle by angle, selects a direction angle having the largest count value, and determines the selected direction angle as a skew angle of an object within the image. The skew angle decision part 140 calculates the direction angles of the character strings, accumulates the count values of direction angles angle by angle, and determines a direction angle having the largest count value as a skew angle.

A skew correction part 150 receives an input image signal output from the input part 110, rotates the image signal based on the skew angle determined by the skew angle decision part 140, and corrects a skew of an object in the received image.

An image correction part 160 inserts an image signal into a corner of the image in which the skew of the object is corrected. That is, if the skew correction part 150 corrects the skew of the object within the image, a region in which no pixel exists occurs due to the rotation of the image. The image correction part 160 performs a function of filling specified pixels in an empty region of the image, caused by the skew correction. Because the pixels are filled irrespective of character data, an output of the skew correction part 150, even though it is directly output to a recognition part 170, does not affect the process of recognizing characters from the detected image.

The recognition part 170 recognizes an image signal output from the image correction part 160.

Operation of the device for correcting a skew of an object in an image according to the first embodiment of the present invention will now be described in detail. The binarization part 120 divides an input image into blocks, classifies the divided blocks into character blocks and background blocks, and then binarizes image pixels of the classified character blocks and background blocks into character pixels and background pixels. The candidate stripe generation part 180 then performs dilation on character regions in the binarized image so that neighboring characters can be connected to each other, and makes vertical stripes using character strings having characters. Here, the character strings in the form of a stripe are called "candidate stripes." Thereafter, the stripe classification part 135 classifies stripes having a predetermined size or larger and having a long shape among the candidate stripes. The skew angle decision part 140 calculates direction angles of the classified stripes, and determines a direction angle having the largest count value among the calculated direction angles as a skew angle. The skew correction part 150 then corrects a skew of an object in the image by rotating the input image by the skew angle. The image correction part 160 corrects the image by inserting pixels into the regions where no pixel exists in the image in which the skew of the object is corrected, and then outputs the corrected image to the recognition part 170. Alternatively, the image correction part 150 may directly provide its output to the recognition part 170 without the image correction so as to allow the recognition part 170 to recognize characters in the image.

Operation of the device for correcting a skew of an object in an image according to the second embodiment of the present invention will now be described in detail. The binarization part 120 divides an input image into blocks, classifies the divided blocks into character blocks and background blocks, and then binarizes image pixels of the classified character blocks and background blocks into character pixels and background pixels. The horizontal pixel subsampling part 190 performs horizontal subsampling on the binarized image. That is, the horizontal pixel subsampling part 190 reduces the horizontal pixels in order to allow character strings to be appropriately horizontally arranged in the form of stripes in the following candidate stripe generation part 180. The candidate stripe generation part 180 then performs dilation on character regions in the binarized image so that neighboring characters can be connected to each other, and makes vertical stripes using character strings having characters. Here, the character strings in the form of a stripe are called "candidate stripes." Thereafter, the vertical pixel subsampling part 195 performs vertical subsampling on the image converted into the candidate stripes at a preset ratio, and recovers an original aspect ratio. Thereafter, the stripe classification part 135 classifies stripes having a predetermined size or larger and having a long shape among the candidate stripes in which the horizontal and vertical pixels are subsampled at a preset ratio. The skew angle decision part 140 calculates direction angles of the classified stripes, and determines a direction angle having the largest count value among the calculated direction angles as a skew angle. The skew correction part 150 then corrects a skew of an object in the image by rotating the input image by the skew angle. The image correction part 160 corrects the image by inserting pixels into the regions where no pixel exists in the image in which the skew of the object is corrected, and then outputs the corrected image to the recognition part 170. Alternatively, the image correction part 150 may directly provide its output to the recognition part 170 without the image correction so as to allow the recognition part 170 to recognize characters in the image.

In the first and second embodiments of the present invention, the stripe classification part 135 calculates eccentricity and/or a blob size of each stripe, and outputs a signal for calculating a direction angle of each stripe. Here, the stripe classification part 135 classifies stripes for calculating a direction angle using stripes in which the binarized characters are connected to each other. Operations of the first and second embodiments of the present invention will now be described in detail. Herein, an operation of the device for correcting a skew according to the second embodiment will be described in detail.

The input part 110 receives an input image. The input image has a size of N×M pixels. In the embodiment of the present invention, it is assumed that the input image has a size of 640 (N)×480 (M) pixels. In addition, the input image can be processed to be a color image or a gray image not having color information. In the embodiment of the present invention, it is assumed that the input image is a gray image.

The binarization part 120 divides the input image into blocks, classifies the blocks into character blocks and background blocks, and binarizes classified block images.

Figure 3:
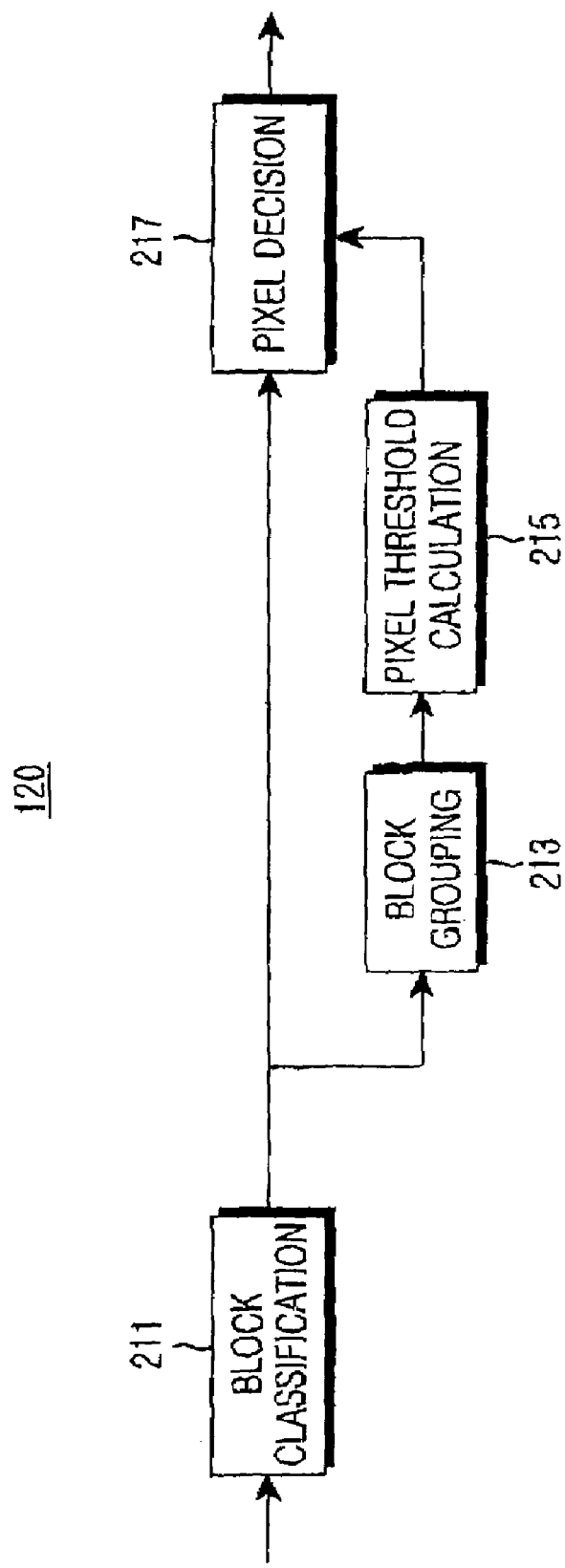
FIG. 3 is a detailed block diagram illustrating a structure of the binarization part shown in FIGS. 1 and 2.

FIG. 3 is a detailed block diagram illustrating a structure of the binarization part 120. The binarization part 120 divides the input image into blocks with a predetermined size, classifies the blocks into character blocks and background blocks, and binarizes pixels of the classified block images into character pixels and background pixels. The binarization part 120 classifies the blocks into the character blocks and background blocks and then binarizes the block image pixels in order to detect direction angles of character strings and hence detect a skew angle of an object for the image in the process of correcting the skew of the object for the image.

Referring to FIG. 3, a block classification part 211 divides the input image into blocks having a preset block size and classifies the divided blocks into character blocks and background blocks. A block grouping part 213 groups each of the character blocks along with 8 adjacent blocks, and a pixel threshold calculation part 215 generates a threshold from the grouped blocks. A pixel decision part 217 collectively converts pixels of the background blocks output from the block classification part 211 into background pixels having a second brightness value using the threshold output from the pixel threshold calculation part 215. The pixel decision part 217 binarizes the pixels of the character blocks into character pixels having a first brightness value and background pixels having the second brightness value based on the threshold.

Figure 4:
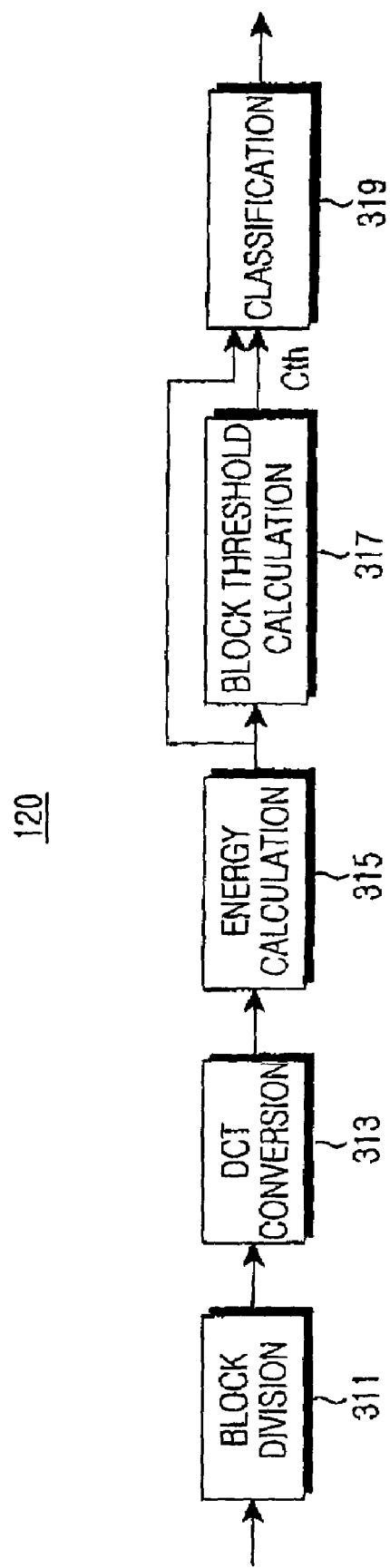
FIG. 4 is a detailed block diagram illustrating a structure of the block classification part shown in FIG. 3.

FIG. 4 is a detailed block diagram illustrating a structure of the block classification part 120 in FIG. 3. Referring to FIG. 4, a block division part 311 divides an input image into blocks having a predetermined size. When the image has 640×480 pixels and each of the blocks has 8×8 pixels, the block division part 311 divides the input image into 4800 blocks.

Figure 5A:
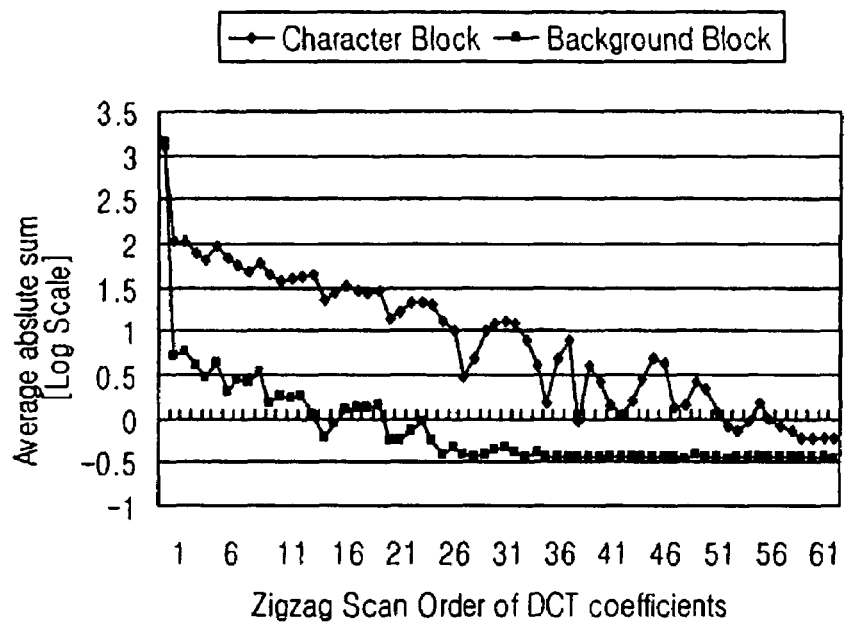
FIGS. 5A through 5C are diagrams illustrating characteristics for calculating a sum of absolute values of dominant DCT coefficients in an energy calculation part of a block classification part.
Figure 5B:
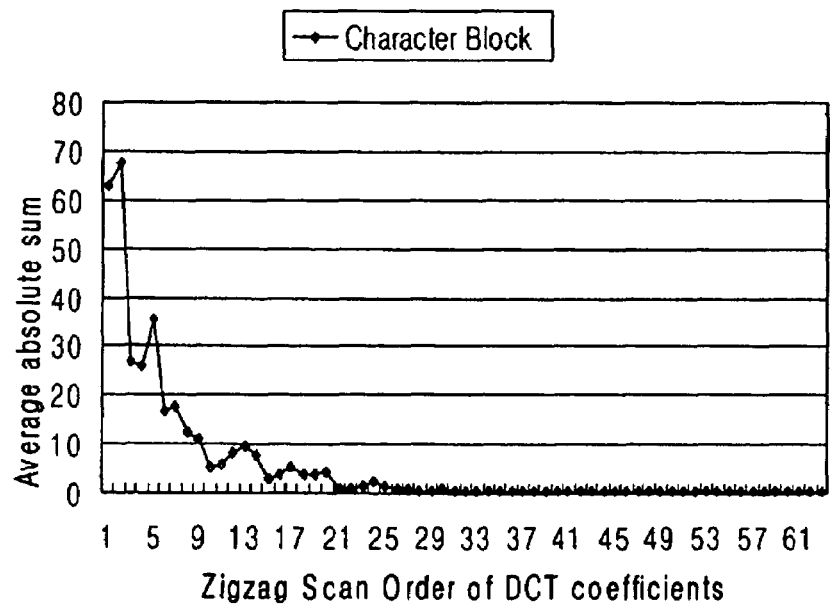

The blocks output from the image dividing part 311 are applied to a discrete cosine transform (DCT) conversion part 313, and the DCT conversion part 313 performs DCT conversion on the blocks. An energy calculation part 315 calculates a sum of absolute values of dominant DCT coefficients within the DCT-converted blocks. An energy distribution value of the DCT coefficients within the character blocks is larger than that of DCT coefficients within the background blocks. FIG. 5A is a diagram illustrating a comparison of energy distributions of DCT coefficients for the character blocks and the background blocks. In FIG. 5A, a Y axis represents an average of the absolute sums in a log scale, and an X axis represents a zigzag scan order of the DCT coefficients. As illustrated in FIG. 5A, it can be noted that DCT coefficients of the character blocks are larger in their average values than the DCT coefficients of the background blocks. FIG. 5B is a diagram illustrating an energy distribution characteristic of DCT coefficients for the character blocks. In FIG. 5B, a Y axis represents an average of the absolute sums in a normal scale, and an X axis represents a zigzag scan order of the DCT coefficients. As illustrated in FIG. 5B, it can be noted that an average of absolute sums of some DCT coefficients for the character blocks is relatively larger. Thus, in the embodiment of the present invention, it is assumed that the dominant DCT coefficients used in a block classification process are $D_1$ to $D_9$ shown in FIG. 5C. Accordingly, a sum of the absolute values of the dominant DCT coefficients in a $k^{th}$ block can be calculated by $$S^k = \sum_{i=1}^{9} |D_i^k| \qquad (1)$$

In Equation (1), $|D_i^k|$ denotes an $i^{th}$ dominant DCT coefficient of the $k^{th}$ block, and $S^k$ denotes the sum of the absolute values of the dominant DCT coefficients in the $k^{th}$ block. Thus, in the embodiment of the present invention, a sum of absolute values of the dominant DCT coefficients $D_1$ to $D_9$ is calculated.

The energy calculation part 315 performs calculation of Equation (1) on all blocks (at k=0, 1, 2, . . . , 4799). Energy values $S^k$ (k=0, 1, 2, . . . , 4799) calculated block by block are applied to a block threshold calculation part 317.

The block threshold calculation part 317 sums the energy values $S^k$ (k=0, 1, 2, ..., 4799) calculated block by block, and produces an average value $<S^k>$ by dividing the summed energy value by the total number TBN of blocks. The average value $<S^k>$ is calculated by Equation 2 below. The average value $<S^k>$ becomes a block threshold Cth used for determining the blocks as character blocks or background blocks.

$$\langle S^k \rangle = \frac{1}{TBN} \sum_{k=1}^{TBN} S^k \quad (2)$$
$$= Cth$$

In Equation (2), TBN denotes the total number of blocks.

A classification part 319 sequentially receives energy values (corresponding to sums of the absolute values of dominant DCT coefficients) output from the energy calculation part 315 on a block-by-block basis. The classification part 319 classifies the blocks as character blocks or background blocks by comparing the received block energy values with the block threshold Cth. At this time, the classification part 319 classifies the corresponding block #BN as a character block (CB) if $S^k \geq Cth$, and classifies the corresponding block #BN as a background block (BB) if $S^k < Cth$ as defined in Equation (3) below.

$$\text{IF } S^k \geq Cth \text{ then } CB \quad (3)$$
$$\text{else } BB$$

The pixels of character blocks classified by the block classification part 211 can have gray levels between 0 and 255. An image of a character block output from the block classification part 211 is input into the block grouping part 213 and the pixel decision part 217.

The classified blocks output from the block classification part 211 are applied to the block grouping part 213. At this time, the binarization part 120 collectively converts the background blocks into background pixels in order to classify character strings of the image. Thus, it is assumed that the binarization part 120 does not perform block grouping and threshold calculation operations on the background blocks.

The block grouping part 213 groups 8 adjacent blocks centering on each of the character blocks output from the block classification part 211 to thereby generate a grouped block having a size of 24×24 pixels. The character block has a size of 8×8 pixels. If a threshold for distinguishing background pixels from character pixels is determined using only one character block having such a size and a binarization process is performed based on the determined threshold, discontinuity between blocks in the binarized image can occur as a size of a block is very small and a difference between the threshold and adjacent character block values is very large. Thus, it is possible to improve reliability of binarization by generating the grouped block and extending a region for the binarization.

The pixel threshold calculation part 215 calculates a pixel threshold Pth for classifying each pixel of the character block as a character or background pixel. The pixel threshold calculation part 215 produces the pixel threshold Pth, and the pixel threshold Pth is used for classifying each pixel of the character block as a character or background pixel and binarizing the character or background pixel. The pixel threshold Pth can be selected using Otsu's method or Kapur's method that selects a gray value having the maximum between-class variance between two types of pixels. It is assumed that the pixel threshold Pth is calculated using Otsu's method. The calculation of the pixel threshold Pth using Otsu's method is based on Equation (4) below. The method made by N. Otsu is disclosed in "A Threshold Selection Method from Gray-Level Histograms", *IEEE Trans. Systems, Man and Cybernetics*, Vol. SMC-9, No. 1, pp. 62-66, January 1979, which is incorporated herein by reference.

$$Th_1 = \arg\max_T \sigma_B^2(T) \quad (4)$$

$$\sigma_B^2(T) = P_1(\mu_1(T) - \mu)^2 + P_2(T)(\mu_2(T) - \mu)^2$$
$$= P_1(T)P_2(T)(\mu_1(T) - \mu_2(T))^2$$

$\sigma_B^2(T)$: between − class variance $T$: gray value $\mu$: mean of the total pixels $\mu_i(T)$: mean of each class defined by $T$ $P_i(T)$: relative frequency of each class The pixel decision part 217 binarizes the character block pixels output from the block classification part 211 into character and background pixels using the pixel threshold, and collectively binarizes the background block pixels into background pixels. That is, the pixel decision part 217 compares the pixel threshold Pth corresponding to the received character block image with values of the character block pixels, classifies image pixels as character pixels if the values of the character block pixels are equal to or larger than the pixel threshold Pth, and classifies image pixels as background pixels if the values of the character block pixels are smaller than the pixel threshold Pth. The pixel decision part 217 performs the binarization operation by converting the character pixels into pixels having a brightness value "α" and converting the background pixels into pixels having a brightness value "β" according to the classification results. A method for binarizing character block pixels by means of the pixel decision part 217 is defined as $$y_B(m, n) = \begin{cases} \alpha, & \text{if } y(m, n) \geq Pth \\ \beta, & \text{otherwise} \end{cases} \quad (5)$$

In Equation (5), y(m,n) denotes pixels of the character block output from the block classification part 211, Pth is the pixel threshold, and $y_B(m,n)$ denotes pixels of the binarized character blocks.

The pixel decision part 217 receives pixels of the background block output from the block classification part 211, and collectively converts the background block pixels into pixels having the brightness value "β".

The image binarized by the binarization part 120 can be input to the candidate stripe generation part 180 or the horizontal pixel subsampling part 190. Here, it is assumed that the binarized image is input to the horizontal pixel subsampling part 190.

The horizontal pixel subsampling part 190 performs horizontal subsampling on the binarized image at a preset ratio.

Assuming that a subsampling ratio is 2:1, the horizontal pixel subsampling part 190 performs horizontal subsampling on the binarized image at the subsampling ratio of 2:1, and thus reduces the number of horizontal pixels of the binarized image by ½. The horizontal pixels are reduced in order to allow the candidate stripe generation part 180 to appropriately arrange character strings in the form of stripes.

The candidate stripe generation part 180 receives the binarized image output from the binarization part 120 or receives the horizontally-reduced binarized image output from the horizontal pixel subsampling part 190. The candidate stripe generation part 180 makes stripes out of the character strings of the received image. The candidate stripe generation part 180 can be implemented by a morphological filter having a dilation part and an erosion part. The morphological filter performs dilation and erosion on a character region so that characters are close to one another. That is, the dilation part performs dilation on the binarized character region, such that neighboring characters become close to one another and hence character strings in which characters are close to one another are generated. Here, the generated character strings can be referred to as "candidate stripes." Furthermore, the erosion part performs erosion on the generated candidate stripes. Adjacent up and down candidate stripes connected by the dilation operation can be separated by the erosion operation. The above-described morphological filter is disclosed in a reference entitled "Digital Image Processing," by R. C. Gonzalez, R. Woods, et al., $2^{nd}$ ed., Prentice Hall, pp. 519-560, 2002, which is incorporated herein by reference.

The vertical pixel subsampling part 195 vertically subsamples the image output from the candidate stripe generation part 180 at a preset ratio. Here, it is assumed that a subsampling ratio is 2:1 as in the horizontal pixel subsampling part 190. The vertical pixel subsampling part 195 can be used for converting the ratio of width to length corresponding to the image reduced by the horizontal pixel subsampling into an original image aspect ratio. The vertical pixel subsampling part 195 vertically reduces the image by ½ to output the reduced image. Here, a horizontal pixel extension part can be used in place of the horizontal pixel subsampling part 195 so that a size restoration to the original image can be achieved.

The stripe classification part 135 can receive an output image being a binarized image from the binarization part 120, an output image from the candidate stripe generation part 180 or an output image from the vertical pixel subsampling part 195. Here, it is assumed that the stripe classification part 135 receives the output image from the vertical pixel subsampling part 195.

The stripe classification part 135 labels stripe numbers for the candidate stripes generated from the binarized image. The candidate stripes having the labeled stripe numbers are used for calculating a direction angle. Then, the stripe classification part 135 analyzes the candidate stripes having the labeled stripe numbers, and discriminates stripes having a predetermined length or larger and having a long shape from the candidate stripes. The candidate stripe classification method uses a blob size and eccentricity based on a moment. Equation (6) below defines a centroid moment to be used when a blob size and eccentricity are calculated, the blob size is calculated at p=0 and q=0 in Equation (6). Equation (7) shows a method for calculating the eccentricity using the centroid moment. The eccentricity calculation method is disclosed in a reference entitled "Digital Image Processing Algorithms," by Pitas, Prentice Hall, pp. 326-331, 1993, which is incorporated herein by reference.

$$\mu_{pq} = \sum_x \sum_y (x - \bar{x})^p (y - \bar{y})^q$$

$\bar{x}$: horizontal centroid of object (6)
$\bar{y}$: vertical centroid of object $$e = \frac{4\mu_{11}^2 + (\mu_{20} - \mu_{02})^2}{(\mu_{20} + \mu_{02})^2} \qquad (7)$$

In Equation (7), the eccentricity e denotes a length of a candidate stripe.

The blob size $\mu$ (=$\mu_{00}$) and eccentricity e calculated by Equations (6) and (7) are compared with preset thresholds $\mu$th and eth, thus to select candidate stripes as valid stripes. Here, the thresholds $\mu$th and eth are calculated using a predetermined experiment. Where $\mu \geq \mu$th and/or e$\geq$eth, a corresponding candidate stripe is classified as a valid stripe. However, any one or both of the blob size $\mu$ and the eccentricity e are smaller than their thresholds $\mu$th and eth, the candidate stripe is not selected as a valid stripe. That is, under this condition, it is determined that the corresponding candidate stripe is not appropriate for calculation of a direction angle, so the stripe is not selected as a valid stripe. In the embodiment of the present invention, a candidate stripe capable of satisfying the conditions that $\mu \geq \mu$th and e$\geq$eth is selected as a valid stripe. In an alternative embodiment of the present invention, a candidate stripe can be determined to be a valid stripe according to only any one of the two conditions.

Figures 5C, 6:
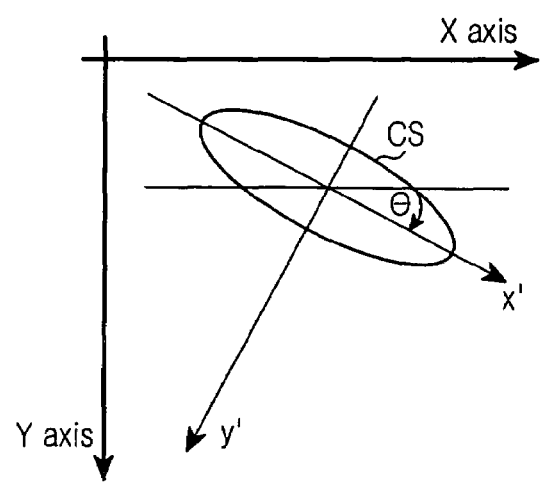
FIG. 6 is a graph illustrating a method for calculating a skew angle of a stripe in the skew angle decision part shown in FIGS. 1 and 2.

The stripes classified by the stripe classification part 135 are input into the skew angle decision part 140, and the skew angle decision part 140 calculates a direction angle θ for each of the classified stripes, and accumulates and stores count values of calculated direction angles. A direction angle having the largest count value is determined to be a skew angle. FIG. 6 is a graph illustrating a method for calculating a skew angle of a stripe in the skew angle decision part 140 according to an embodiment of the present invention. In FIG. 6, CS denotes a stripe classified by the stripe classification part 135, and an x' axis and a y' axis are coordinate axes associated with the stripe CS. Thus, a direction angle θ between the x' axis and a real X axis for each of stripes output from the stripe classification part 135 is calculated, and count values of directions angles θ are accumulated and stored. The direction angle θ for the stripe CS can be calculated by $$\theta = \frac{1}{2} \arctan\left(\frac{2\mu_{11}}{\mu_{20} - \mu_{02}}\right) \qquad (8)$$

After direction angles θ for all stripes have been completely calculated, the skew angle decision part 140 analyzes the accumulated count values of direction angles θ, and determines a direction angle θ having the largest count value as a skew angle. In other words, the skew angle decision part 140 determines a direction angle θ associated with a largest number of stripes as the skew angle.

If the skew angle has been determined, the skew correction part 150 rotates an input image output from the input part 110 by the skew angle determined by the skew angle decision part 140 to correct a skew of image signals. That is, the skew correction part 150 rotates the image on the basis of a rotation matrix if the skew angle has been determined.

At this time, an inverse mapping method can be used in rotating the image. The inverse mapping and rotation methods are disclosed in a reference entitled "Handbook of Computer Vision and Applications," by B. Jahne, et al., Academic Press, Vol. 2, pp. 94-95, 1999, and a reference entitled "Computer Vision", by L. G Shapiro and G. C. Stockman, Prentice Hall, pp. 415-418, 2001, both of which are incorporated herein by reference.

If the skew correction part 150 rotates the image, a blank space in which no pixel exists is formed at a corner of the image. The blank space can affect the following recognition process. The image correction part 160 performs a function of filling specified pixels in the blank space formed at the corner of the image in which the skew is corrected. When filling the pixels in the blank space formed at the corner of the image in which the skew is corrected, the image correction part 160 can fill pixels having the pixel values closest to the blank space in the blank space. A correction process for the blank space can be collectively performed on the basis of a brightness value of background pixels.

When characters are recognized from the input image, stripes of character strings are extracted from the input image, direction angles are calculated according to skews of the stripes, the most frequently calculated direction angle among the calculated direction angles is determined as a skew angle, and the image is rotated on the basis of the determined skew angle. In this manner, the image in which a skew of an object is corrected can be created. Furthermore, as pixels of a specific pixel brightness value are filled in a blank space formed at the corner of the image when the skew of an object in the image is corrected, an error can be reduced in the recognition process.

Figure 7:
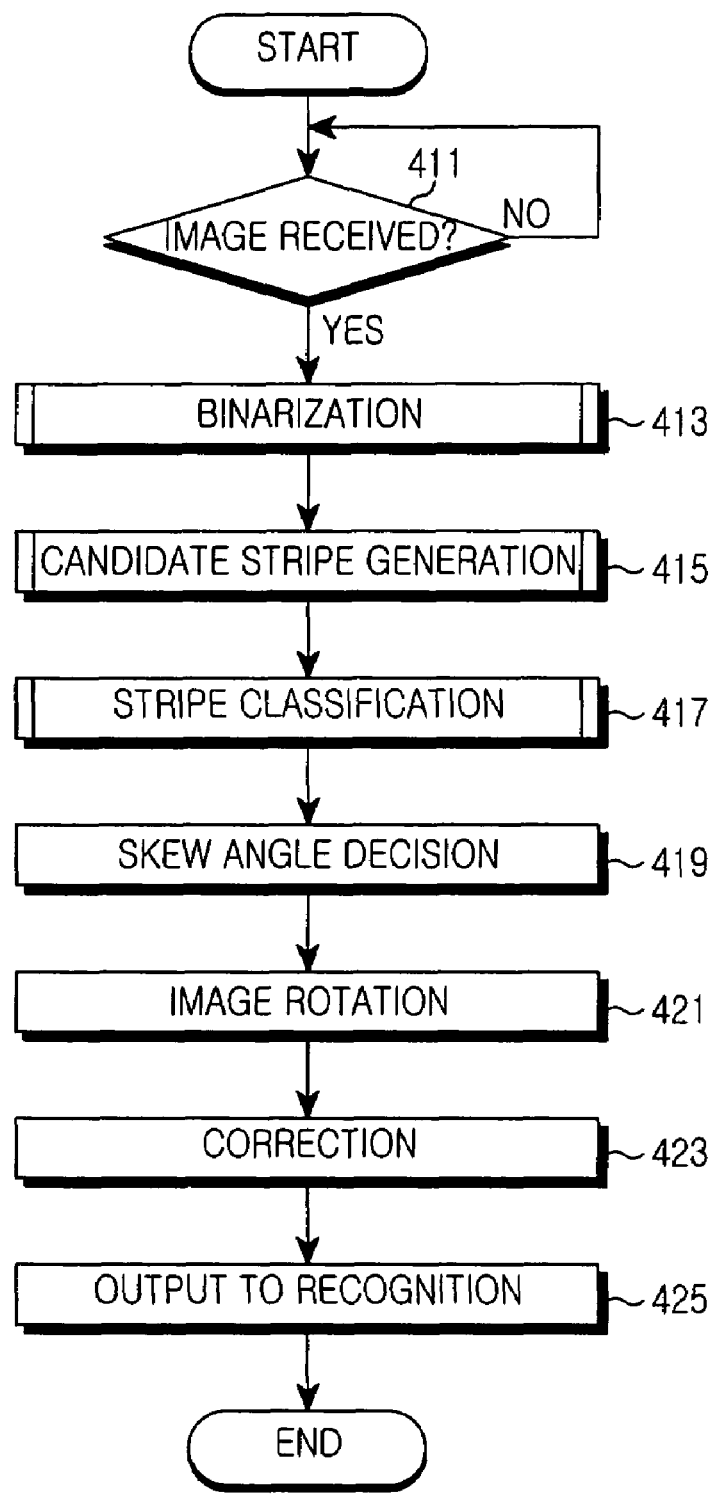
FIG. 7 is a flowchart illustrating a method for correcting a skew of an image according to an embodiment of the present invention.
Figure 8:
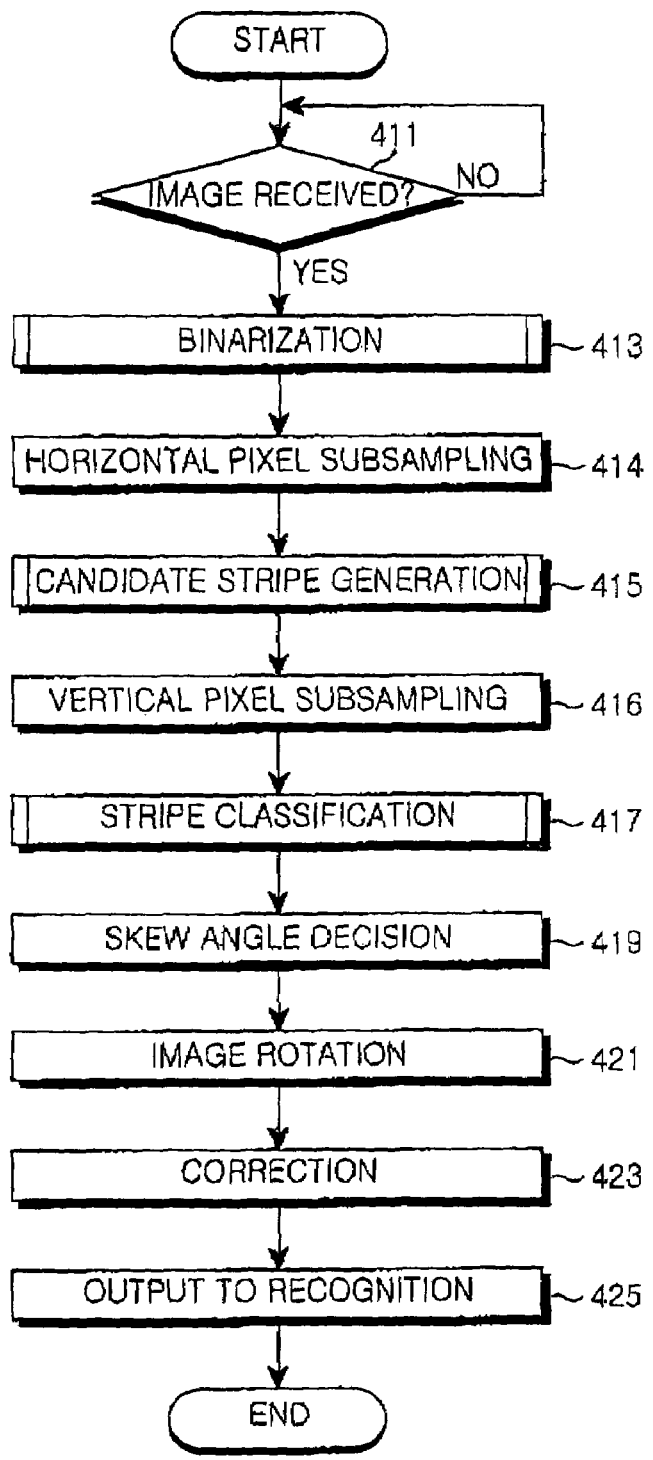
FIG. 8 is a flowchart illustrating a method for correcting a skew of an image according to another embodiment of the present invention.

FIG. 7 is a flowchart illustrating a method for correcting a skew of an image according to a first embodiment of the present invention. If a candidate stripe generation process of step 415 is omitted from FIG. 7, it becomes a method for correcting a skew of an image according to the first embodiment of the present invention. FIG. 8 is a flowchart illustrating a method for correcting a skew of an image according to a second embodiment of the present invention. It should be noted that similar steps will use the same labels, and FIGS. 7, 8, 9, and 10 will be discussed simultaneously. The method for correcting a skew of an image according to the second embodiment of the present invention further includes a horizontal pixel subsampling process of step 414 and a vertical pixel subsampling process of step 416 in addition to the method according to the first embodiment of the present invention. It should also be noted that FIG. 7 is substantially the same as FIG. 8 except FIG. 8 includes the additional step 414 and step 416. Herein, a description of the present invention will be concentrated on the method for correcting a skew of an image illustrated in FIG. 8.

Referring to FIG. 8, if an input image is received in step 411, then an operation of dividing the received image into blocks, classifying the divided blocks into character blocks and background blocks and then binarizing images pixels of the classified character blocks and background blocks into character pixels and background pixels is performed in step 413. In the binarization process of step 413, a process of classifying the blocks into character blocks and background blocks is achieved in the method of FIG. 9, and a process of binarizing the classified character blocks and background blocks is achieved in the method of FIG. 10.

Figure 9:
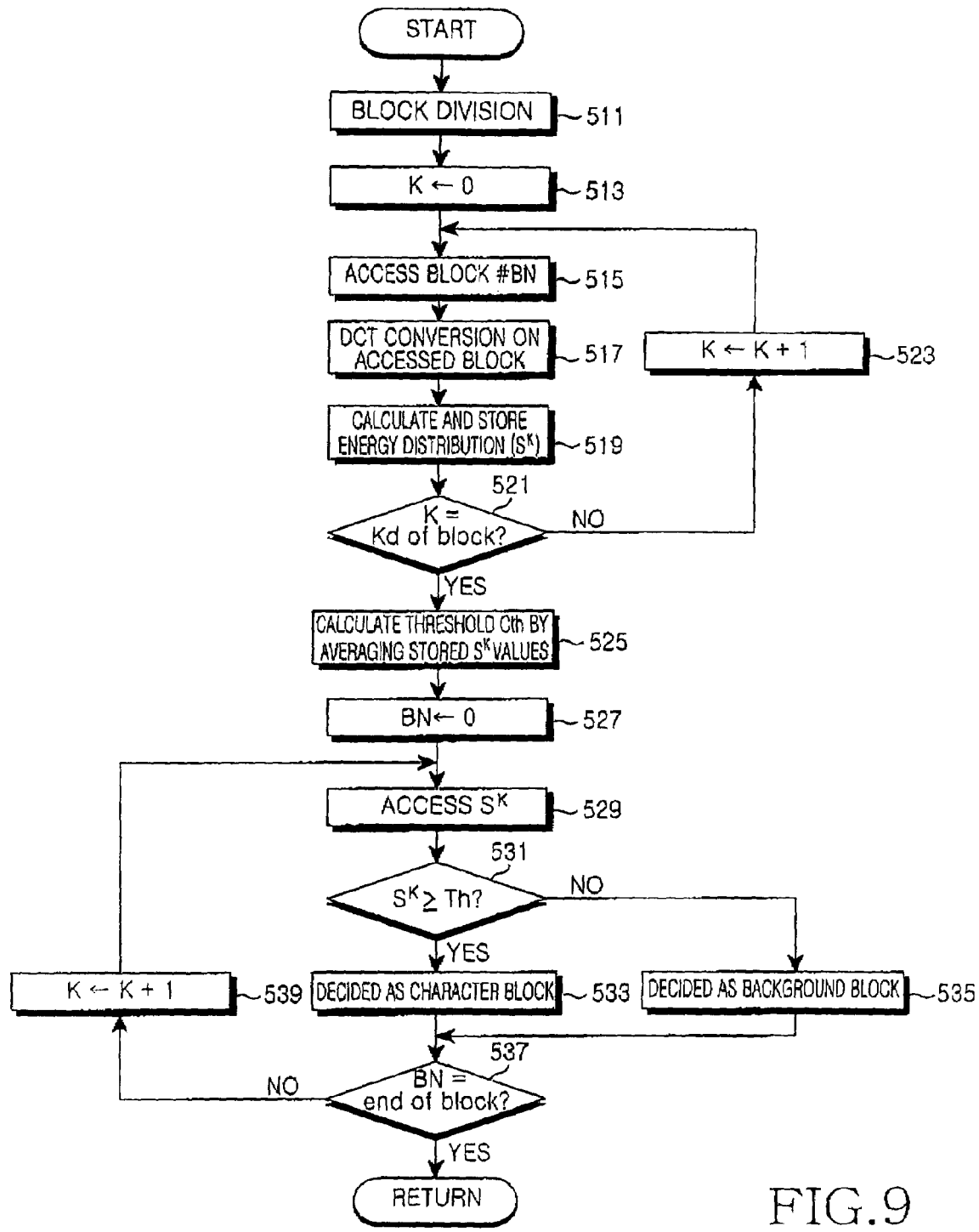
FIG. 9 is a flowchart illustrating a method for classifying an image into blocks in the binarization process of FIGS. 7 and 8.

Referring now to FIG. 9, the method for classifying an image into blocks will be described. When the image is received, the received image is divided into blocks having a predetermined size in step 511. Here, it is assumed that the image has 640×480 pixels and each of the blocks has 8×8 pixels. Therefore, the image is divided into 4800 blocks.

In step 513, a block number BN is set to 0, and in step 515, a block with the block number #BN is accessed. In step 517, the accessed block is DCT-converted, and in step 519, a sum $S^k$ of absolute values of dominant DCT coefficients in the DCT-converted BN block is calculated and stored. At this point, energy distribution of the DCT coefficients for the character blocks has a larger value than that of the DCT coefficients for the background blocks, and energy distributions of the DCT coefficients for the character blocks and background blocks are illustrate in FIG. 5A. The energy distribution of the DCT coefficients for the character blocks have a characteristic shown in FIG. 5B. Therefore, a sum $S^k$ of absolute values of the DCT coefficients in a $k^{th}$ block can be calculated in accordance with Equation (1). Here, 'k' is the same parameter as BN, and denotes a block number. After the $S^k$ is calculated in step 519, it is determined in step 521 whether $S^k$ of the last block is calculated. If $S^k$ of the last block is not calculated, the method increases the block number by one in step 523 and then returns to step 515 to repeat the above operation.

Through repetition of the steps 515 to 523, all blocks (k=0, 1, 2, . . . , 4799) are DCT-converted in accordance with Equation (1). In addition, a threshold Cth is calculated using energy values $S^k$ (k=0, 1, 2, . . . , 4799) of the blocks. That is, in step 525, energy values $S^k$ (k=0, 1, 2, . . . , 4799) calculated for the blocks are summed up, and then, an average value $<S^k>$ is calculated by dividing the summed energy value of all the blocks by the total number TBN of the blocks. Here, the value $<S^k>$ is calculated using Equation (2), and the calculated $<S^k>$ value becomes a threshold Cth used for determining the image block as a character block or a background block.

After the threshold Cth is calculated, an operation of classifying the blocks into character blocks and background blocks is performed. For this, in step 527 the block number BN is initialized to '0', and in step 529, $S^k$ of a block corresponding to the block number BN is accessed. Thereafter, in step 531, the classification part 319 classifies the block corresponding to the block number BN as a character block or a background block by comparing a value $S^k$ of the block with the threshold Cth. In the block classification process, the classification part 319 classifies in step 533 the corresponding block #BN as a character block if $S^k \geq Cth$, and classifies in step 535 the corresponding block #BN as a background block if $S^k < Cth$, as shown in Equation (3). Thereafter, it is determined in step 537 whether a corresponding block is the last block. If the corresponding block is not the last block, the method increases the block number by one in step 539, and then returns to step 529 to repeat the above operation. When the operation is completed, the block classification result is output. After the image is divided into blocks having a predetermined size, the blocks are classified into character blocks and background blocks.

The classified character blocks undergo block grouping. That is, each of the character blocks is grouped along with 8 adjacent blocks, creating a grouped block having a size of 24×24 pixels. In addition, a pixel threshold Pth for classifying pixels in the character blocks into character pixels and background pixels is calculated using the grouped blocks. The pixel threshold Pth is used for distinguishing character pixels from background pixels during binarization. At this point, the pixel threshold Pth is calculated using Otsu's method or Kapur's method that selects a gray value having the maximum between-class variance between two types of pixels. It is assumed herein that the pixel threshold Pth is calculated using Otsu's method in accordance with Equation (4).

An operation of binarizing image pixels of the character blocks is performed using the pixel threshold Pth. The binarization process is performed in the method of FIG. 10.

Figure 10:
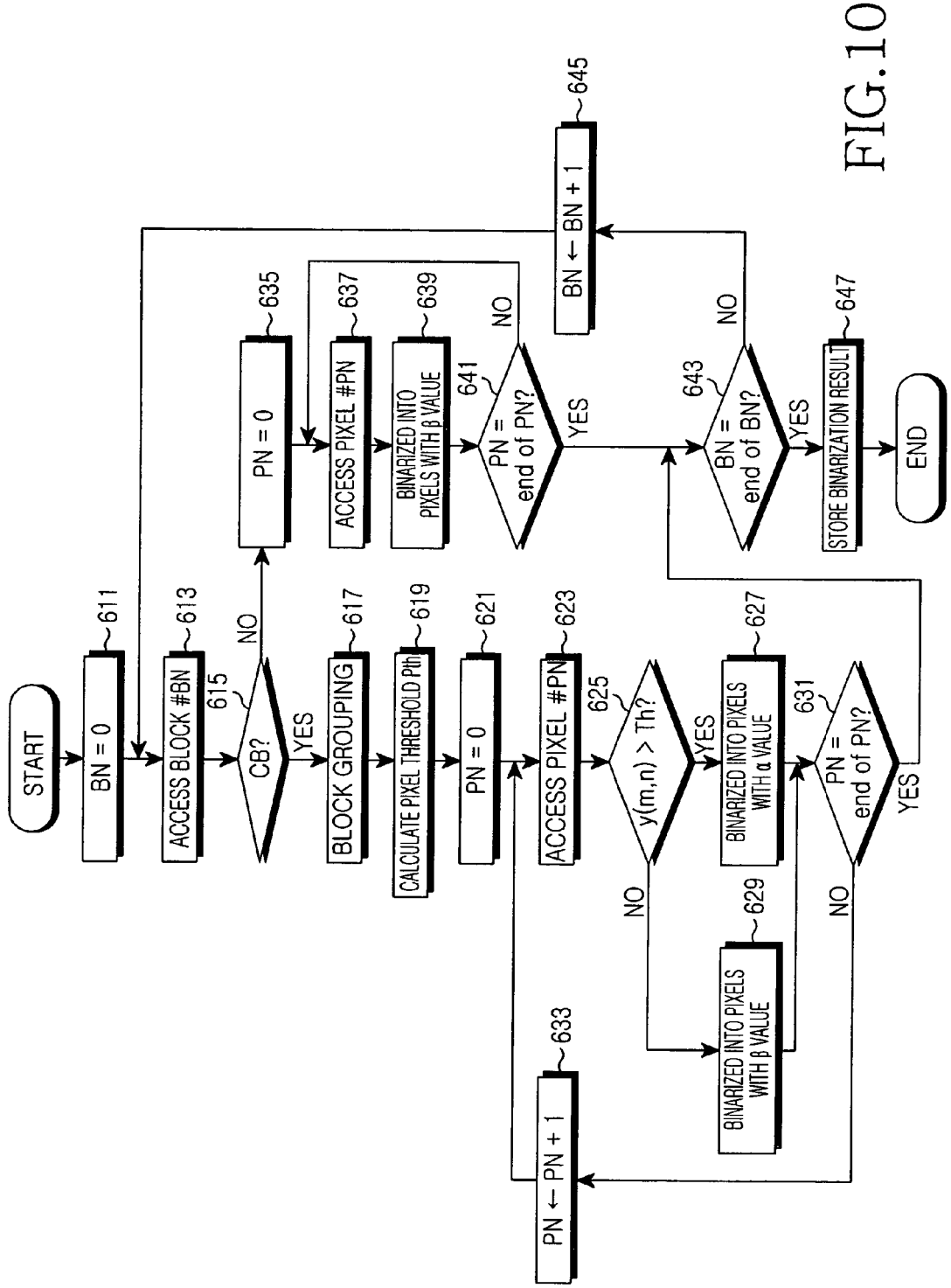
FIG. 10 is a flowchart illustrating a method for binarizing classified character blocks and background blocks binarized in the binarization process of FIGS. 7 and 8.

Referring to FIG. 10, a block number BN is initialized to '0' in step 611, and a block #BN is accessed in step 613. It is determined in step 615 whether the accessed block #BN is a character block or a background block. If the accessed block #BN is a character block, neighboring blocks of the character block are grouped in step 617, creating a grouped block. In step 619, a pixel threshold Pth is calculated using the grouped block. In step 621, a pixel number PN of the character block is initialized to '0', and in step 623, a pixel with the pixel number PN is accessed. Thereafter, in step 625, the accessed pixel is compared with the pixel threshold Pth, to binarize the accessed pixel into a pixel having a brightness value $\alpha$ or a pixel having a brightness value $\beta$. That is, if a brightness value of the accessed pixel is larger than or equal to the pixel threshold Pth, the corresponding pixel is converted into a pixel having a brightness value $\alpha$ in step 627. In contrast, if a brightness value of the accessed pixel is less than the pixel threshold Pth, the corresponding pixel is converted into a pixel having a brightness value $\beta$ in step 629. Thereafter, in step 631, it is determined whether the binarization for all pixels in the corresponding block is completed. If the binarization operation is not completed, the method increases the pixel number by one in step 633, and then returns to step 623 to repeatedly perform the above binarization process. In contrast, if the binarization operation is completed, all pixels in the character block are binarized into pixels having a brightness value $\alpha$ or $\beta$. However, if it is determined in step 615 that the accessed block is a background block, steps 635 to 641 are performed to collectively convert all pixels in the background blocks into pixels having a brightness value $\beta$.

After the binarization is performed on the character blocks, it is determined in step 643 whether a currently binarized block is the last block of the image. If the currently binarized block is not the last block of the image, the method increases the block number BN by one in step 645, and then returns to step 613 to repeatedly perform the above operation. Through repetition of the above operation, pixels in the character blocks and background blocks of the image are binarized. If it is determined in step 643 that the last block of the image is binarized, the binarization result values of the image are stored in step 647.

In FIG. 10, the block grouping of step 617 and the pixel threshold Pth calculation of step 619 may be performed before the binarization operation. In this case, after the block classification operation is performed, block grouping and pixel threshold Pth calculation procedures are performed on each of the character blocks and then the calculated pixel thresholds Pth are stored in a region with a corresponding character block number BN of a memory (not shown). Thereafter, if it is determined in step 615 that the accessed block is a character block, the pixel threshold Pth of the corresponding character block is accessed and then the steps 621 to 633 are performed using the accessed pixel threshold Pth to binarize pixels in the character block.

Referring now to FIG. 8, thereafter, in step 414, the binarized image is subjected to vertical subsampling at a predetermined ratio in order to allow character strings to allow character strings to be appropriately arranged in the form of stripes in the following candidate stripes generation process.

Figure 11:
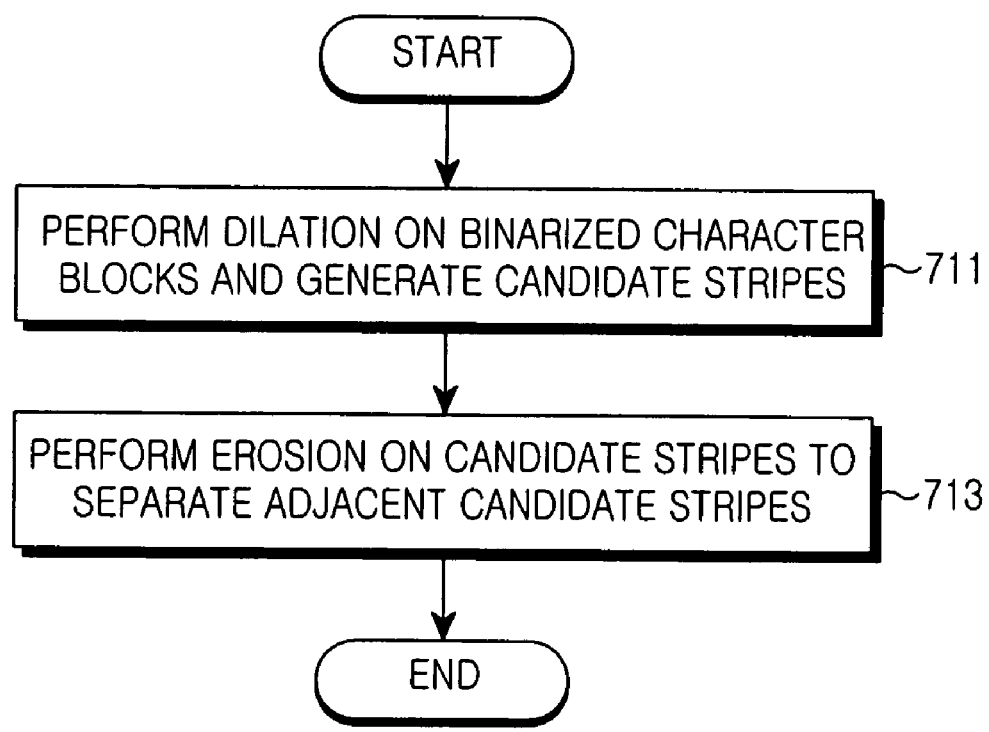
FIG. 11 is a flowchart illustrating the candidate stripes generation methods of FIGS. 7 and 8.

Referring now to FIG. 7, in step 415, candidate stripes are created using character strings consisting of characters in the image in which horizontal pixels are reduced. FIG. 11 is a flowchart illustrating a method for creating the candidate stripes.

Referring to FIG. 11, in step 711, the binarized character regions undergo dilation to generate character strings in which neighboring characters are connected to each other. Here, the generated character strings become candidate stripes. In step 713, the created candidate stripes undergo erosion in order to separate adjacent up and down candidate stripes if they are connected.

Referring now to FIG. 8, thereafter, in step 416, the image having the created candidate stripes undergoes vertical subsampling at a predetermined ratio in order to recover an original aspect ratio from an aspect ratio changed due to the horizontal pixel reduction. Here, a horizontal pixel extension procedure can be performed instead of the vertical pixel reduction operation. In this way, an aspect ratio of the image is restored to its original aspect ratio.

After the vertical pixel subsampling process is performed, stripes whose direction angles are to be calculated are selected from the candidate stripes in step 417. Thereafter, in step 419, direction angles of the selected stripes are calculated, and a direction angle having the largest count value is determined as a skew angle.

Figure 12:
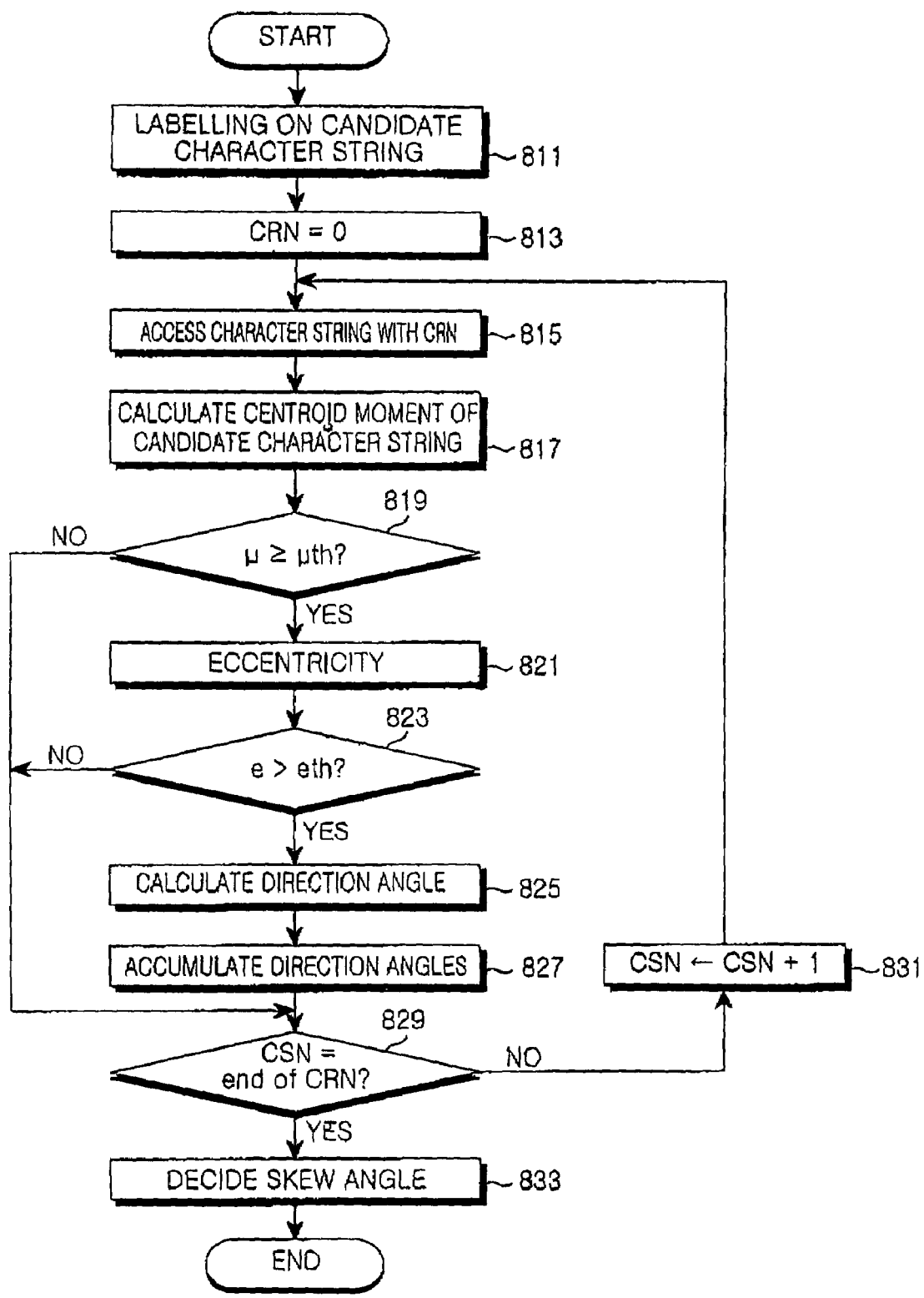
FIG. 12 is a flowchart illustrating a method including the stripe classification process and the skew angle decision process FIGS. 7 and 8.
Figure 13:
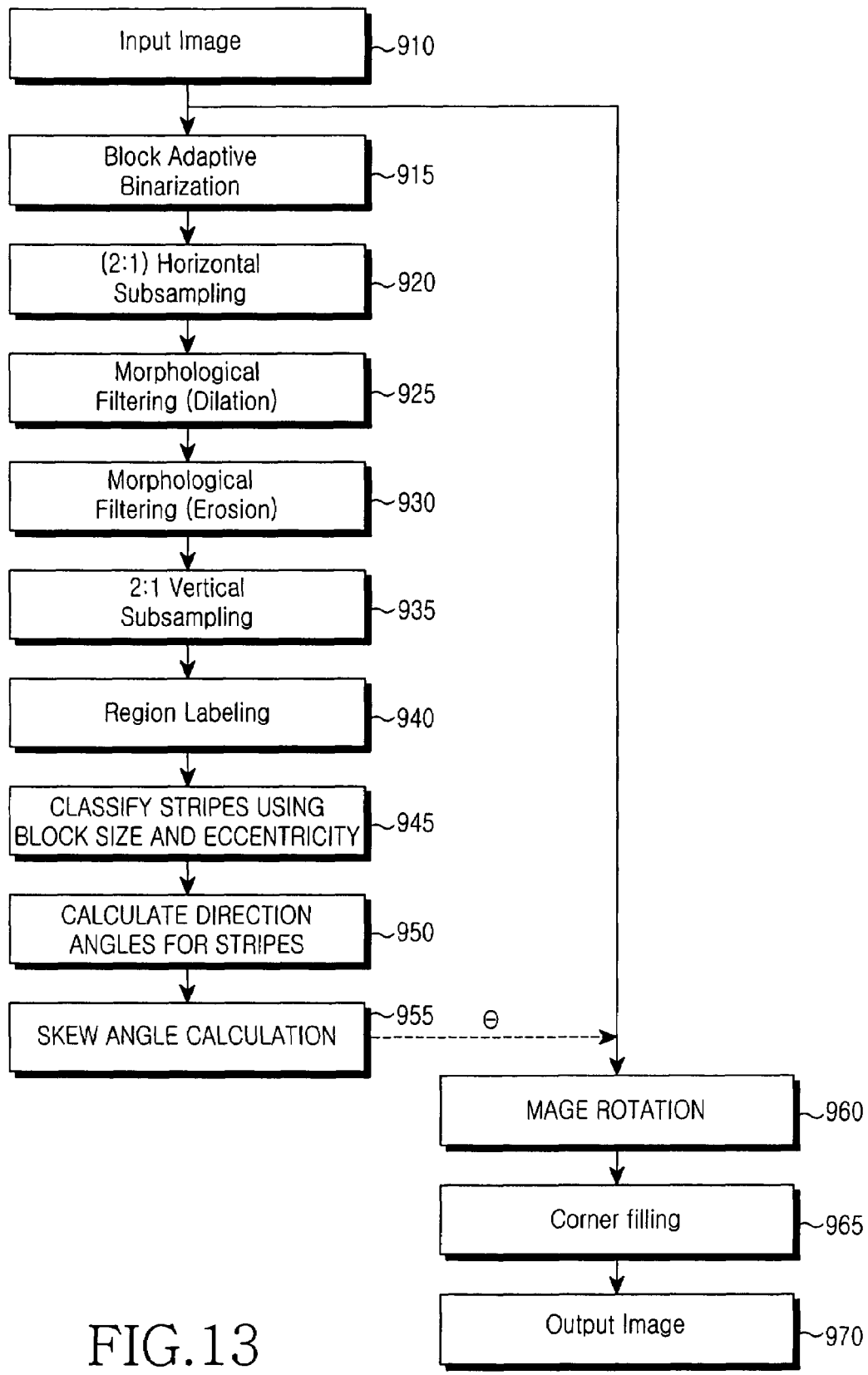
FIG. 13 is a flowchart illustrating the overall skew correction method according to an embodiment of the present invention.

FIG. 12 is a flowchart illustrating a method including a stripe classification process of step 417 and a skew angle decision process of step 419. Referring to FIG. 12, in step 811, the candidate stripes generated from the binarized image are labeled. The labeled candidate stripes are used for calculating a direction angle. In step 813, a candidate stripe number CSN is initialized to '0', and in step 815, a candidate stripe with the CSN is accessed. In step 817, a centroid moment of the character string is calculated. Through steps 819 to 823, a blob size $\mu$ and eccentricity e of the accessed candidate stripe #CSN are calculated, and if the calculated blob size $\mu$ and eccentricity e are larger than or equal to their preset thresholds $\mu$th and eth, the corresponding candidate stripe #CSN is classified as a valid stripe. Here, the blob size $\mu$ ($=\mu_{oo}$) can be calculated using Equation (6), and the eccentricity e can be calculated in accordance with Equation (7). The eccentricity e represents a length of the candidate stripe, and the blob size $\mu$ represents a size of the stripe. However, in step 819 to 823, if any one or both of the blob size $\mu$ and the eccentricity e are less than their thresholds $\mu$th and eth, the candidate stripe #CSN is not selected as a valid stripe. That is, under this condition, it is determined that the corresponding candidate stripe is not appropriate for calculation of a direction angle, so the stripe is not selected as a valid stripe. In FIG. 12, the blob size $\mu$ is first determined, and subsequently, the eccentricity e is determined, by way of example. Alternatively, however, the eccentricity e can be first determined, and thereafter, the blob size $\mu$ can be determined. In addition, only any one of the blob size $\mu$ and the eccentricity e can be analyzed in determining whether the candidate stripe is a valid strip.

If the candidate stripe is a determined as a valid stripe through the steps 819 to 823, a direction angle $\theta$ of the corresponding stripe #CSN is calculated in accordance with FIG. 6 and Equation (8) in step 825, and the calculated direction angle $\theta$ is stored in step 827. That is, if the candidate stripe is determined as a valid stripe, a direction angle of the stripe is calculated and stored. Through repetition of this process, direction angles of the stripes are accumulated, and the direction angles are identical in number to the stripes.

After the direction angle of the stripe is stored, if a candidate stripe fails to be determined as a valid stripe in the steps 819 to 823, it is determined in step 829 whether a current candidate stripe number CSN represent the last candidate stripe. If the current candidate stripe is not the last candidate stripe, the procedure increases the CSN by one in step 831, and then returns to step 815 to access the next candidate stripe with the increased CSN and repeatedly perform the above operation on the accessed candidate stripe. Through repetition of such a process, it is determined whether the candidate stripes are valid stripes. In addition, direction angles of the determined stripes are calculated and accumulated. Thereafter, if it is determined in step 829 that the current candidate stripe is the last candidate stripe, the accumulated direction angles are analyzed to determine a direction angle having the largest count value as a skew angle, in step 833.

Referring now to FIG. 8, when the skew angle is determined, the image is rotated by the determined skew angle in step 421, to correct a skew of an object in the image. Thereafter, in step 423, a blank space occurred at corners of the image in which a skew of an object is corrected is filled with specified pixels. In step 425, the corrected image is output to the recognition part.

With reference to FIGS. 13 and 14A through 14H, a description will now be made of the method for correcting a skew of an object in an image according to an embodiment of the present invention.

Figure 14A:
FIGS. 14A through 14H are diagrams illustrating shapes of an image generated in each process of FIG. 13.

Here, it is assumed that an input image received in step 910 is the same as that shown in FIG. 14A. The image of FIG. 14A is subjected to adaptive block binarization in step 915, creating a binarized image shown in FIG. 14B. In the binarization process, the received image is divided into blocks having a predetermined size, and the divided blocks are classified into character blocks and background blocks. Each of the character blocks is grouped along with 8 adjacent blocks, making a grouped block, and a pixel threshold used for classifying pixels of a block image into character pixels and background pixels is created from the grouped block. Thereafter, pixels of the classified character blocks are compared with the pixel threshold to classify the pixels into character pixels and background pixels, and all pixels of the background blocks are collectively converted into background pixels. As a result, in step 915, pixels of the input image shown in FIG. 14A are binarized into character pixels and background pixels shown in FIG. 14B.

Figure 14B:
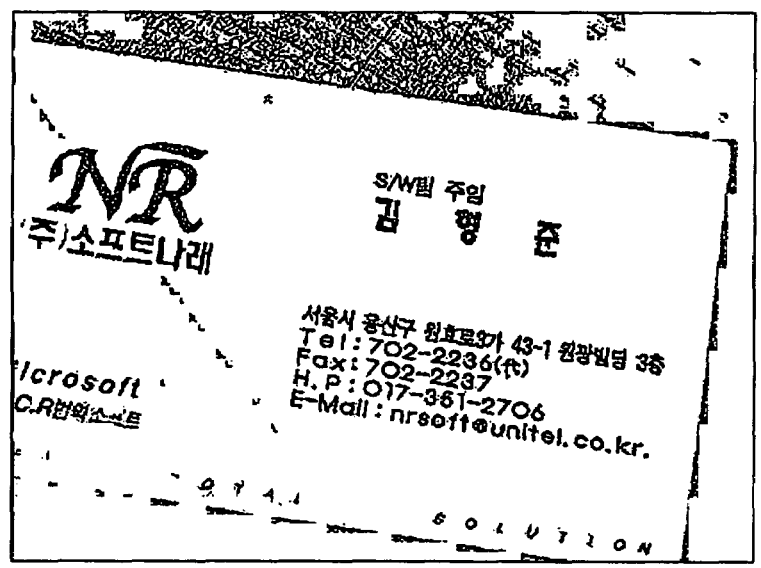
Figure 14C:
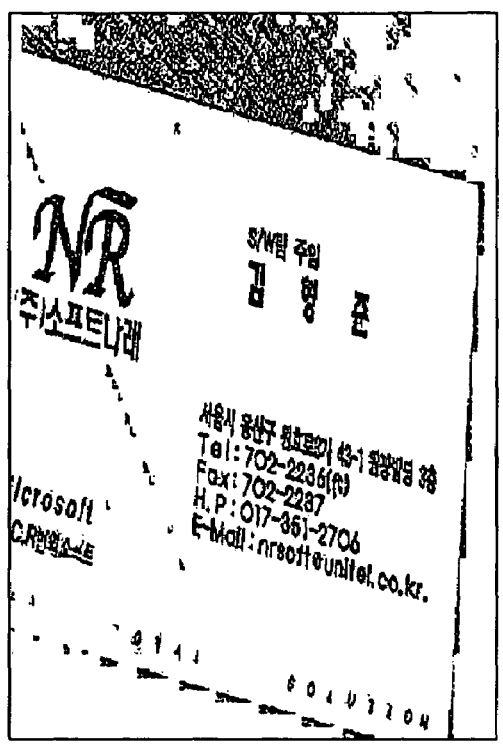
Figure 14D:
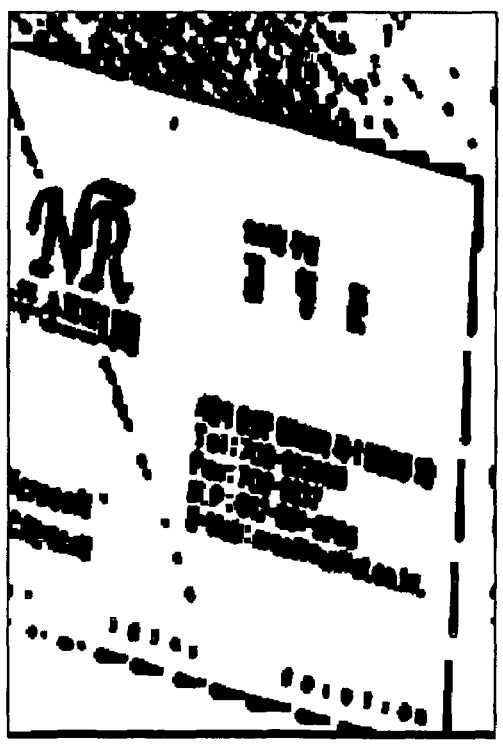
Figure 14E:
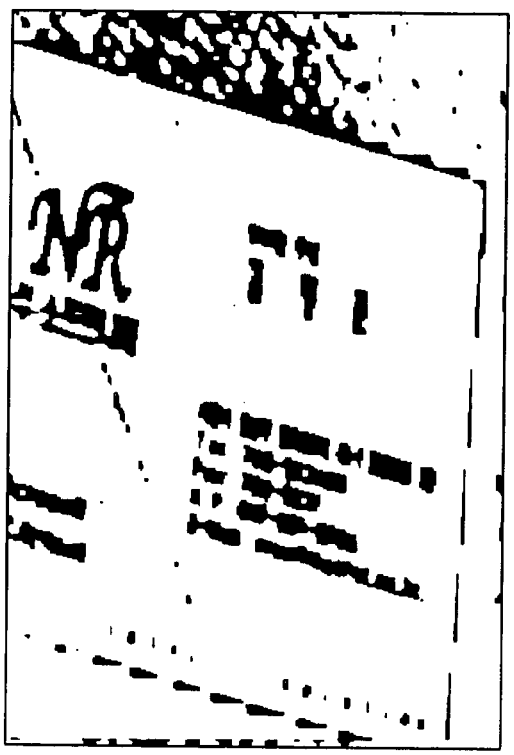
Figure 14F:
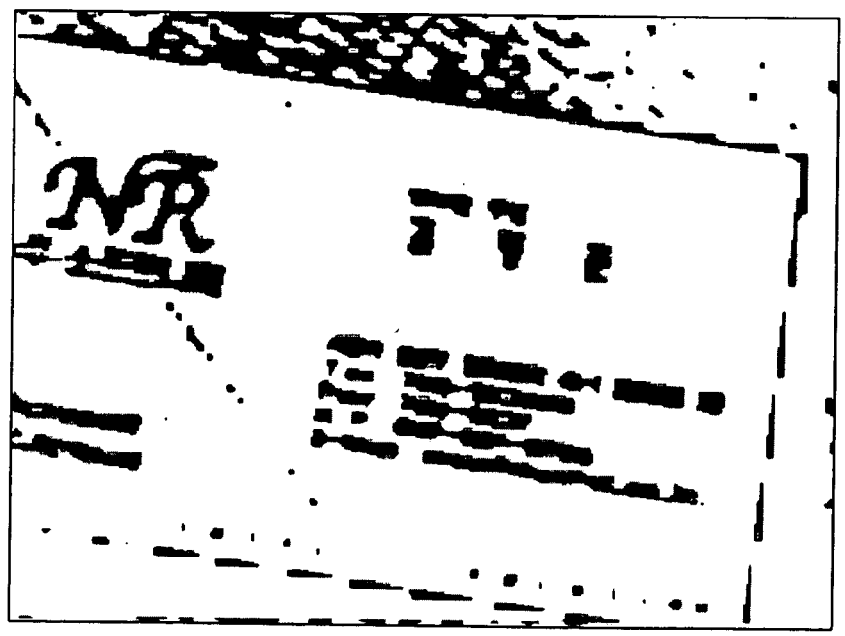

In step 920, the binarized image of FIG. 14B is converted into an image shown in FIG. 14C through horizontal subsampling. FIG. 14C illustrates a resultant image obtained by performing 2:1 horizontal subsampling on the mage shown in FIG. 14B, and the reason for performing vertical pixel subsampling is to allow character strings to be appropriately arranged in the form of stripes in the following candidate stripes generation process. Thereafter, in steps 925 and 930, the horizontal-subsampled image shown in FIG. 14C is subjected to morphological filtering, creating candidate stripes. That is, in step 925, binarized character regions of the image shown in FIG. 14C undergo dilation to connect neighboring characters to each other, thereby generating candidate stripes shown in FIG. 14D. In step 930, the adjacent up and down candidate stripes connected in the dilation process are separated as shown in FIG. 14E. After the morphological filter is performed, the image of FIG. 14E undergoes 2:1 vertical subsampling in step 935 to recover an original aspect ratio of the image. FIG. 14F illustrates a resultant image determined by performing 2:1 vertical subsampling on the morphologically-filtered binarized image, and the reason for performing the vertical pixel subsampling is to calculate a skew angle of a character string from the reduced image.

In step 940, candidate stripes in the image of FIG. 14F are labeled, and in step 945, a blob size and eccentricity of each of the candidate stripes are calculated, and stripes used for calculating direction angles are selected. In step 950, direction angles of the selected stripes are calculated and accumulated. When the direction angles of the selected stripes are completely calculated, a direction angle having the largest count value among the accumulated direction angles is determined as a skew angle of the image in step 955.

Figure 14G:
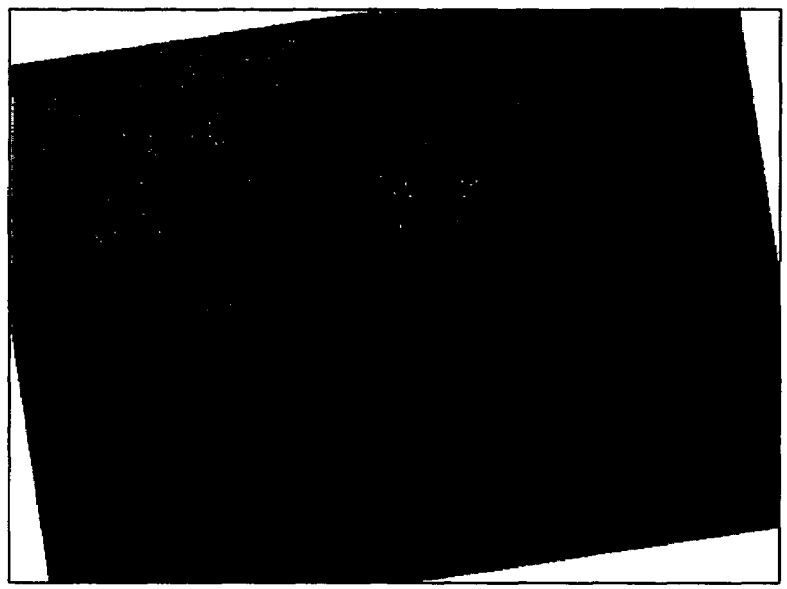
Figure 14H:

If the skew angle is determined, the input image is rotated by the skew angle in step 960 to correct a skew of the image as shown in FIG. 14G The skew-corrected image of FIG. 14G has blank spaces at its corners in which no pixel exists due to rotation of the image. In order to correct the blank spaces, the corners of the image are filled in step 965 with the closest horizontal pixel values as shown in FIG. 14H. Thereafter, in step 970, the skew/pixel-corrected image of FIG. 14H is output to the recognition part.

As described above, in a preprocessing operation for recognizing an image signal, a skew angle is determined by calculating a skew of an input image and the skew is corrected by rotating the input image by the skew angle, thus contributing to an increase in character recognition performance. In addition, blank spaces at corners of the image, caused by the rotation of the image, are filled with specified pixels, thereby correcting the image.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A device for correcting a skew of an object in an image, comprises:
   an input part for receiving an image;
   a binarization part for binarizing pixels of the image into pixels having brightness values associated with character pixels and background pixels;
   a candidate stripe generation part for generating candidate stripes by performing dilation on character regions of the binarized image;
   a stripe classification part for classifying candidate stripes having a predetermined eccentricity and blob size among the candidate stripes, as valid stripes;
   a skew angle decision part for calculating direction angles of the classified stripes, and determining a direction angle having the largest count value as a skew angle; and
   a skew correction part for correcting a skew of an image by rotating the mage by the skew angle.

2. The device of claim 1, further comprising an image correction part for filling a blank space at a corner of the image, in which a skew of an object in the image is corrected by the skew correction part, with pixels close to the blank space in a horizontal direction.

3. The device of claim 1, wherein the binarization part further comprises:
   a block classification part for dividing the image into blocks having a predetermined size, calculating pixel energies of the divided blocks, and classifying the blocks into character blocks and background blocks according to the calculated pixel energies;

a pixel threshold calculation part for calculating a pixel threshold using by calculating a brightness value having the maximum between-class variance between character pixels and background pixels in the character blocks output from the block classification part; and a binarization part for binarizing pixels in the character blocks output from the block classification part into pixels having brightness values for character pixels and background pixels based on a comparison of the pixel energies output from the block classification part with the pixel threshold, and converting the pixels in the background blocks into background pixels.

4. The device of claim 3, wherein the block classification part further comprises:

a block division part for dividing the input image into blocks having a predetermined size;

a Discrete Cosine Transform (DCT) conversion part for DCT-converting the image blocks output from the block division part;

an energy calculation part for calculating a sum of absolute values of dominant DCT coefficients in each of the DCT-converted blocks, and outputting the calculated sum as an energy value of the corresponding block;

a threshold calculation part for summing energy values of the blocks, output from the energy calculation part, and generating a threshold by dividing the sum of the energy values by the total number of the blocks; and a classification part for sequentially receiving the block energy values output form the energy calculation part, and classifying the blocks into character blocks and background blocks by comparing the received block energy values with the threshold.

5. The device of claim 4, wherein each of the blocks has a size of 8×8 pixels, and the energy value of each block is calculated by $$S^k = \sum_{i=1}^{9} |D_i^k|$$

where $|D_i^k|$ denotes an $i^{th}$ dominant DCT coefficient of a $k^{th}$ block, and $S^k$ denotes a sum of absolute values of dominant DCT coefficients in the $k^{th}$ block.

6. The device of claim 3, further comprising:

a block grouping part connected to the block classification part and the pixel threshold calculation part, for grouping neighboring blocks of a character block output from the block classification part along with the character block, and outputting the grouped block to the pixel threshold calculation part.

7. The device of claim 1, wherein the candidate stripe generation part comprises:

a dilation part for dilating a region of the binarized character block and generating candidate stripes in which neighboring characters are connected; and an erosion part for performing erosion on the candidate stripes so that candidate stripes situated at up and down of the dilated candidate stripes are separated.

8. The device of claim 7, wherein the candidate stripe generation part comprises a morphological filter.

9. The device of claim 1, wherein the stripe classification part calculates a length of a candidate stripe through calculation of a blob size and eccentricity based on a moment of the candidate stripe, and classifies the corresponding candidate stripe as a valid stripe when the eccentricity and the blob size are larger than or equal to their predetermined thresholds.

10. The device of claim 9, wherein the blob size is calculated by the following equation in which p and q are 0, $$\mu_{pq} = \sum_x \sum_y (x - \bar{x})^p (y - \bar{y})^q$$

$\bar{x}$: horizontal centroid of object
$\bar{y}$: vertical centroid of object wherein the eccentricity is calculated by $$e = \frac{4\mu_{11}^2 + (\mu_{20} - \mu_{02})^2}{(\mu_{20} + \mu_{02})^2}$$

where the eccentricity e denotes a length of a candidate stripe.

11. The device of claim 1, wherein the skew angle decision part calculates direction angles of the classified stripes, and determines a direction angle having the largest count value as a skew angle.

12. The device of claim 11, wherein the skew angle decision part calculates a direction angle of a stripe in accordance with the following equation.

$$\theta = \frac{1}{2} \arctan\left(\frac{2\mu_{11}}{\mu_{20} - \mu_{02}}\right).$$

13. A device for correcting a skew of an object in an image, comprising:

an input part for receiving an image;

a binarization part for binarizing pixels of the image into pixels having brightness values for character pixels and background pixels;

a horizontal pixel subsampling part for performing horizontal subsampling on the binarized image at a predetermined ratio;

a candidate stripe generation part for dilating character blocks in the binarized image and generating candidate stripes;

a vertical pixel subsampling part for performing vertical subsampling on the image having the candidate stripes at a predetermined ratio;

a stripe classification part for classifying candidate stripes having a predetermined eccentricity and blob size among the vertical-subsampled candidate stripes, as valid stripes;

a skew angle decision part for calculating direction angles of the classified stripes, and determining a direction angle having the largest count value as a skew angle; and a skew correction part for correcting a skew of an object in an image by rotating the mage by the skew angle.

14. The device of claim 13, further comprising:

an image correction part for filling a blank space at a corner of the image in which a skew of an object in the image is corrected by the skew correction part, with pixels close to the blank space in a horizontal direction.

15. A method for correcting a skew of an object in an image, comprising the steps of:
- receiving an image;
- binarizing pixels of the image into pixels having brightness values associated with character pixels and background pixels;
- dilating character regions of the binarized image and generating candidate stripes;
- classifying candidate stripes having a predetermined eccentricity and blob size among the candidate stripes, as valid stripes;
- calculating direction angles of the classified stripes;
- determining a direction angle having the largest count value among direction angles as a skew angle; and
- correcting a skew of an image by rotating the mage by the skew angle.

16. The method of claim 15, further comprising the step of filling a blank space at a corner of the skew-corrected image, with pixels close to the blank space in a horizontal direction.

17. A method for correcting a skew of an object in an image, comprising the steps of:
- receiving an image;
- binarizing pixels of the image into pixels having brightness values associated with character pixels and background pixels;
- performing horizontal subsampling on the binarized image at a predetermined ratio to reduce horizontal pixels;
- dilating character blocks in the vertical-subsampled binarized image and generating candidate stripes;
- performing vertical subsampling on the binarized image having the candidate stripes at a predetermined ratio to reduce vertical pixels;
- classifying candidate stripes having a predetermined eccentricity and blob size among the vertical-subsampled candidate stripes, as valid stripes;
- calculating direction angles of the classified stripes;
- accumulating the direction angles and determining a direction angle having the largest count value as a skew angle; and
- correcting a skew of an object in an image by rotating the mage by the skew angle.

18. The method of claim 17, further comprising the step of:
- filling a blank space at a corner of the skew-corrected image, with pixels close to the blank space in a horizontal direction.

* * * * *